United States Patent [19]

Sekida et al.

[11] 4,170,410
[45] Oct. 9, 1979

[54] LIGHT MEASURING DEVICES FOR CAMERAS WITH AUTOMATIC EXPOSURE CONTROL

[75] Inventors: Minoru Sekida; Kazuo Kimura, both of Sakai, Japan

[73] Assignee: Minolta Camera Kabushiki Kaisha, Osaka, Japan

[21] Appl. No.: 768,732

[22] Filed: Feb. 15, 1977

[30] Foreign Application Priority Data

Feb. 27, 1976 [JP] Japan .............................. 51-21487
Jul. 26, 1976 [JP] Japan .......................... 51-99917[U]

[51] Int. Cl.² .............................................. G03B 7/08
[52] U.S. Cl. .................................. 354/23 R; 354/56; 354/59
[58] Field of Search ............... 354/22, 23 R, 53–56, 354/59, 155

[56] References Cited

U.S. PATENT DOCUMENTS

| | | | |
|---|---|---|---|
| 3,540,363 | 11/1970 | Ono | 354/55 |
| 3,726,197 | 4/1973 | Hasegawa et al. | 354/55 |
| 3,994,001 | 11/1976 | Maitani et al. | 354/51 |
| 4,097,876 | 6/1978 | Uno et al. | 354/59 |

Primary Examiner—John Gonzales
Attorney, Agent, or Firm—Watson, Cole, Grindle & Watson

[57] ABSTRACT

A light measuring device for a camera with automatic exposure control is provided with a light responsive element and a light reflecting optical element, such as a mirror or a transparent block having a light reflecting surface, both elements being disposed outside of the light path from the objective lens to the focal plane for exposure of the film. The light reflecting optical element faces a certain area of the focal plane to receive the light reflected at the surface of the leading shutter member of a focal plane shutter device and/or the surface of the film. The light responsive element faces the optical element to receive the light reflected thereby.

15 Claims, 11 Drawing Figures

LIGHT MEASURING DEVICES FOR CAMERAS WITH AUTOMATIC EXPOSURE CONTROL

BACKGROUND OF THE INVENTION

This invention relates to a light measuring device for a camera with automatic exposure control, which device measures the light reflected by the leading shutter member of a focal plane shutter and/or at the film plane to effect exposure control according to the measured light output obtained.

A known camera light measuring optical system is such that a light measuring element and convex lens, serving as a condensing element, are disposed on the bottom wall of the camera casing whereby light reflected by the upper and lower portions of the surface of a leading shutter member as well as at the film plane are collected through a convex lens onto the light measuring element.

The light measuring optical system of the type described tends to lose its balanced light measurement, in case the convex lens, namely a condensing element, is positioned too close to the focal plane of the objective lens. This is due to the fact that there arises a marked difference in the length of the optical path between: (a) the light reflected by upper portions of the surface of the leading shutter member as well as at the film plane and incident on the light measuring element; and (b) the light reflected by lower portions of the surface of the leading shutter member and the film plane, and incident on the light measuring element. Consequently, the intensity of reflected light by the upper portions of the surface of the leading shutter member is much lower than the light reflected by the lower portions. Thus, it follows that only the light from the lower portions of the surface of the leading shutter member and/or the film plane are measured. Stated otherwise, where the camera is held sideways, an optimum exposure cannot be achieved for a major lower portion of the object if a bright light portion, such as sky, lies in an upper part of the object. Furthermore, there remains some distance between the plane of the leading shutter member and the film plane disposed behind that shutter member, so that there is a vertical difference in the zones of the object which are to be light-measured before and after the travelling of the shutter curtain. If well-balanced light measurement is not obtained as set forth in the foregoing, when it is desired to take a picture of an object having a bright light portion, such as sky, in an upper portion thereof, such vertical difference in the zones of the object results in an increased difference in the light-measured output before and after movement of the shutter curtain.

To eliminate the above-described drawback, it is desirable, in the light measuring optical system of the type described, to mount the condensing element as far towards the front of the camera casing from the focal plane as possible. From the standpoint of the size of the camera casing, it is impossible to mount the condensing element too far towards the front of the camera casing with respect to the focal plane. In prior art light measuring optical systems using a convex lens as a condensing element, the light measuring element is spaced further apart from the focal plane than the convex lens, so that well-balanced light measurement is not obtained unless the camera casing is enlarged.

SUMMARY OF THE INVENTION

It is, accordingly, an object of the present invention to provide a light measuring device for a camera with automatic exposure control, which device enables improved and well-balanced light measurement over the surface of the leading shutter member and/or the film surface without enlarging the dimensions of the camera.

Another object of the present invention is to provide a light measuring device of the above described type which is very reliable and easy to maintain.

To accomplish the aforementioned objects, the light measuring device of the present invention comprises light reflecting optical means and light responsive means respectively disposed outside of the light path from the objective lens to the focal plane. The light reflecting optical means faces a certain area of the focal plane to reflect the light reflected by the surface of the leading shutter member of a focal plane shutter and/or the film surface at the focal plane, i.e., the light reflected by the surface of the leading shutter member before movement of the leading shutter member, the light reflected by the surface of the leading shutter member and the surface of the film during the travelling of the leading shutter member, and the light reflected by the surface of the film after the travelling of the leading shutter member, but before the travelling of the trailing shutter member. The light responsive means faces the light reflecting optical means to receive the light reflected thereby for generating an output for automatic exposure control of the camera.

With such an arrangement, because the light incident on the light responsive means is subjected to the reflection by the light reflecting means, its optical path is lengthened to a considerable extent, which enables improved and well-balanced light measurement over the surface of the leading shutter member and/or the surface of the film. In addition, the distance between the light responsive means and the focal plane can be shortened in spite of the longer optical path of the above light, which does not require the camera to be enlarged.

According to the invention, the light reflecting optical means and the light responsive means are preferably mounted below the optical axis of the objective lens, and the light reflecting optical means converges the light reflected thereat onto the light responsive means. Furthermore, the light responsive means is preferably mounted between the focal plane and the light reflecting optical means, or below the light reflecting optical means. The light reflecting optical means may have one or more mirrors or light reflecting surfaces.

More particularly, in an embodiment according to the present invention, the light reflecting optical means includes a first and a second concave mirror, respectively facing an upper part and a lower part of a specified area of the focal plane. With this arrangement, the light incident on the light responsive means reflected by the first concave mirror is diffused by an upper part of the surface of the leading shutter member and/or the film surface and thus is low in intensity. Whereas, the light incident on the light responsive means reflected by the second concave mirror is normally reflected at a lower part of the surface of the leading shutter member and/or the film surface and thus has high intensity. Thus, for more well-balanced light measurement, the second concave mirror has a light diffusing surface to reduce the intensity of the light reflected thereat onto the light responsive means.

In another embodiment according to the present invention, the light reflecting optical means also includes a first and a second concave mirror respectively facing an upper part and a lower part of a specified area of the focal plane. However, in this embodiment, the first concave mirror is mounted just below the optical axis of the objective lens, and the second concave mirror is divided into two mirror portions symmetrically arranged at opposite sides of the first concave mirror. Thereby, the optical axes of the mirror portions cross the plane defined by the optical axis of the objective lens and the optical axis of the first concave mirror. With this arrangement, the light incident on the light responsive means reflected by the second concave mirror is diffused by the lower part of the leading shutter member surface and/or the film surface. Thus, a more well-balanced photometric measurement is possible without any light reducing means.

In still another embodiment according to the present invention, the light reflecting optical means includes a transparent block having a light incident surface facing a specified area of the focal plane for receiving the light reflected by the leading shutter member surface and/or the film surface. The light reflecting optical means also includes a light reflecting surface, for reflecting the light from the light incident surface, and a light exit surface, from which the light reflected by the light reflecting surface emerges towards the light responsive means. With this arrangement, foreign matter such as dust will not adhere to the light reflecting surface itself because the latter may be formed by deposition of an evaporated substance, such as silver or aluminum, on the transparent block. Thus, the light reflecting surface is always kept clean and thus requires no wiping by which the evaporated substance may be taken off to reduce the light reflecting property of the light reflecting surface. However, foreign matter such as dust will adhere to the light incident surface. But, as no evaporated substance is deposited on the light incident surface, wiping of the foreign matter adhering to the light incident surface will not affect the light introducing property of the light incident surface. Accordingly, the light measuring device is easy to maintain and is highly reliable.

These and other objects and features of the present invention are apparent from the following description taken in connection with the accompanying drawings.

DETAILED DESCRIPTION

Figure 1:
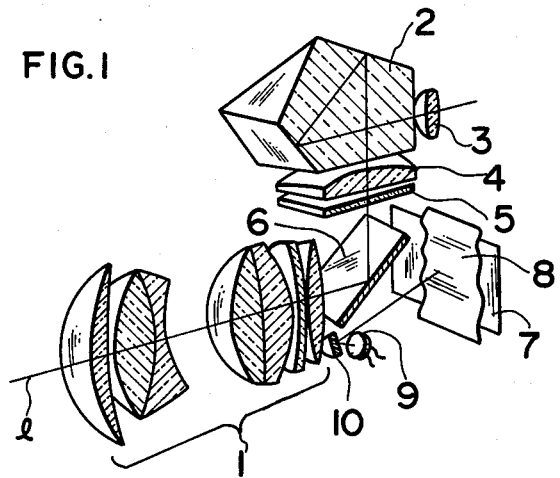
FIG. 1 is a perspective sectional view of an optical system of a single lens reflex camera of a first embodiment of the present invention.
Figure 2:
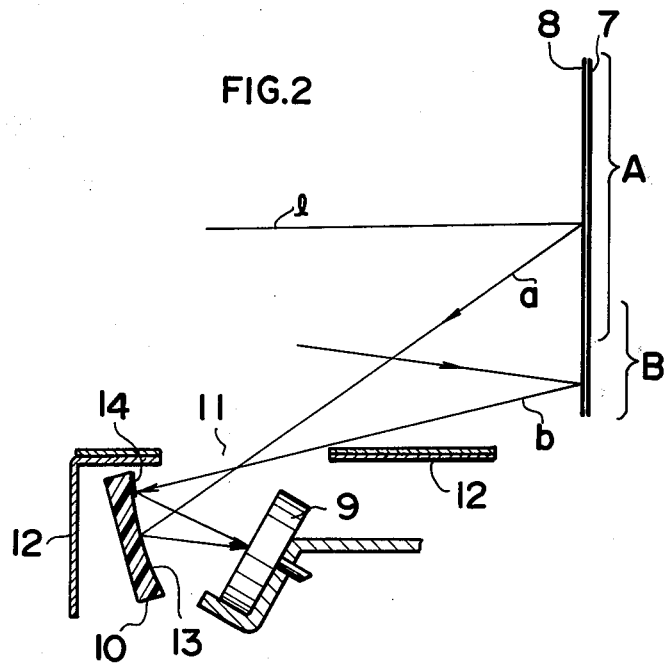
FIG. 2 is a cross-sectional view of essential parts of the first embodiment shown in FIG. 1.

FIGS. 1 and 2 schematically show a first embodiment of the present invention. Objective lens 1, pentagonal prism 2, eyepiece 3, condenser lens 4, focusing plate 5 and movable reflector 6 are mounted to have the operative relationship shown in FIG. 1. Film 7 is disposed at the focal plane of objective lens 1, and front or leading curtain 8 of a focal plane shutter is mounted in front of film 7. When movable reflector 6 is moved to a retracted picture-taking position as a result of shutter release operation, then light transmitted through objective lens 1 first impinges on the surface of front curtain 8, and then after front curtain 8 has travelled, the light impinges on film plane 7.

In FIG. 2, light measuring element 9 and reflecting member 10 are housed within a space defined by light shielding plate 12 having opening 11 and disposed right below optical axis l of objective lens 1. Light reflecting element 10, as best seen in FIG. 2, is composed of a relatively large, first concave mirror 13 and a relatively small, second concave mirror 14 formed in an upper peripheral portion of first mirror 13 and integral therewith. First concave mirror 13 directs the light, diffusely or irregularly reflected by upper regions A of shutter curtain 8 as well as by film plane 7, including the central portions thereof, towards light measuring element 9. Second concave mirror 14 directs light b, normally or regularly reflected by lower regions B of the surface of shutter curtain 8 and by film plane 7, towards light measuring element 9. Second reflector 14 has a frosted glass-like surface to provide a light diffusing capability to damp the intensity of normally reflected light b which is incident on light measuring element 9.

Figure 3:
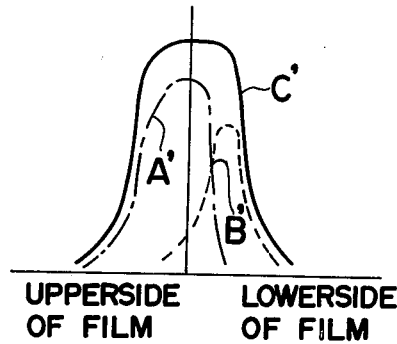
FIG. 3 is a graph showing the distribution of the intensity of the light incident on a light responsive element after being reflected by the surface of the film at the focal plane of an objective lens.

With the construction described, light rays a and b, reflected by the first and second concave reflectors 13 and 14, respectively, and incident on light measuring element 9, present the intensity distribution curves as plotted by dotted lines A' and B' in FIG. 3. As shown, the intensity of reflected light, on the whole, which is incident on light measuring element 9, becomes uniform, thus presenting a curve as plotted by solid line C' in FIG. 3, whereby well-balanced light measurement may be achieved substantially over the entire light measuring region of an object.

However, in case the prior art light measuring optical system is used for effecting light measurement under the same condition as in the case of the first embodiment, with a concave lens mounted in the position of reflector 10, then the light measuring element must be spaced further apart from the focal plane than the concave lens. As a result, light shielding plate 12 shown in FIG. 2 must be extended toward the front of the camera casing, which results in an increase in its size, and hence an enlargement in the size of the camera itself. In this embodiment, light measuring element 9 is mounted closer to the focal plane than reflecting element 10 mounted in opposing relation thereto, so that there is no need to enlarge the camera casing and hence the size of the camera itself.

However, as second concave mirror 14 has a frosted glass-like surface, the light incident on light measuring element 9 by the reflection at concave mirror 14 is lowered to the level as represented by the curve A' in FIG. 3, so that well-balanced light measurement may be achieved. The intensity of reflected light b, immediately after being reflected by the shutter curtain surface and the film surface, is high.

Figure 4:
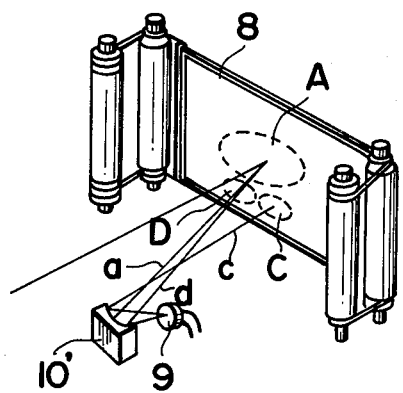
FIG. 4 is a perspective view of essential parts of a second embodiment of the present invention.
Figure 5:
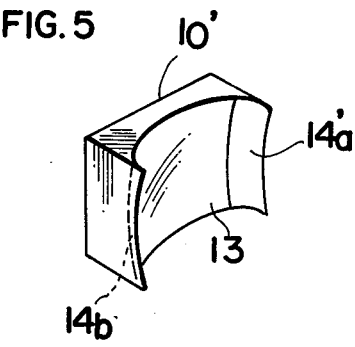
FIG. 5 is a perspective view of a light reflecting member shown in FIG. 4.

FIGS. 4 and 5 show a second embodiment, wherein in place of second concave mirror 14, having a light dispersing capability of that of the first embodiment, two elements of a second concave mirror are so arranged that their optical axes cross a plane defined by the optical axes of photographic lens 1 and first concave mirror 13, thereby enabling well-balanced light measurement, as in the first embodiment.

Reflecting element 10', as best seen in FIG. 5, is composed of first concave mirror 13, and two elements 14a, 14b of a second concave mirror, each of which is formed integrally with first concave mirror 13 and on the opposite sides thereof. First concave mirror 13 is positioned right below the optical axis of objective lens 1, as in the first embodiment, and reflects the light which is diffusely reflected by the upper zone A of the surface of front curtain 8 and at film plane 7, including the central areas thereof, to thereby direct the light towards light measuring element 9. However, second concave mirror elements 14a and 14b are disposed on the opposite sides of first concave mirror 13 in mirror-image relation in a manner so that the respective optical axis of each of the second concave mirror elements crosses a plane defined by the optical axis of objective lens 1 and first concave mirror 13. Second concave mirror element 14a reflects the light c from the right lower zones C of the shutter curtain surface and the film plane, to thereby direct light c to light measuring element 9. Second concave mirror element 14b reflects the light d from the left lower zones D of the shutter curtain surface to light measuring element 9.

With this embodiment, first concave mirror 13 and second concave mirror elements 14a and 14b are obliquely oriented with respect to the surface of front curtain 8 and film plane 7, whereas light having a high intensity due to normal reflection by the surface of front curtain 8 and/or film plane 7 is reflected by the second concave mirror elements and then diverted from light measuring element 9, except that diffusely reflected light alone is incident on light measuring element 9. This eliminates the possibility that reflected light having high intensity due to normal reflection by a specific zone exerts undue influence on the light measuring output, thus enabling well-balanced light measurement, without imparting a light diffusing capability to second concave mirror elements 14a and 14b themselves.

In the embodiments previously described, only a single light measuring element is provided to achieve well-balanced light measurement. As a modification of the aforedescribed embodiments, a pair of reflecting elements 10 and 10' and a pair of light measuring elements may be disposed in the opposite end portions of the bottom wall of a camera casing or on the left and right side walls thereof in symmetrical relation, so that the respective light measuring elements may share the measurement of light reflected by the left and right zones or the upper and lower zones of the surface of front curtain 8 and film plane 7. In such an arrangement, the range of well-balanced light measurement may be greatly enlarged. Also, one of the second concave mirror elements 14a or 14b, as shown in FIG. 4, may be omitted.

Although reflecting element 10, consisting of two different kinds of concave mirrors (namely a first and second concave mirror) is used in either of the two embodiments shown, reflecting element 10 may be a single aspheric concave mirror.

The embodiments previously described have the following drawbacks. It is a common practice to manufacture reflecting means by vacuum-evaporation deposition of aluminum or silver on a base plate. A film of aluminum or silver thus formed according to vacuum-evaporation deposition, however, is liable to be peeled when dust or stain adhering to the surface of the reflecting means is wiped off. Should part of such a film be peeled, the reflecting means has a lower reflecting capability, with the resultant failure to maintain the intended performance of the light measuring optical system.

Figure 6:
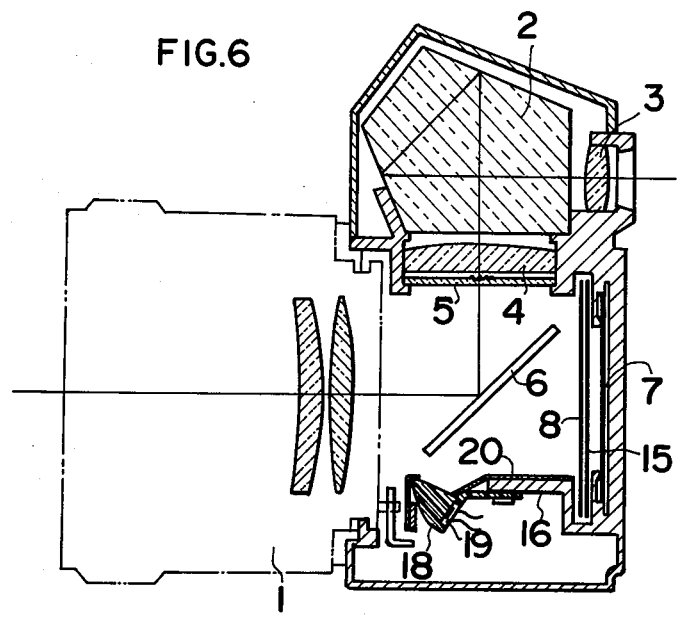
FIG. 6 is a cross-sectional view of a single lens reflex camera embodying a third embodiment of the present invention.
Figure 7:
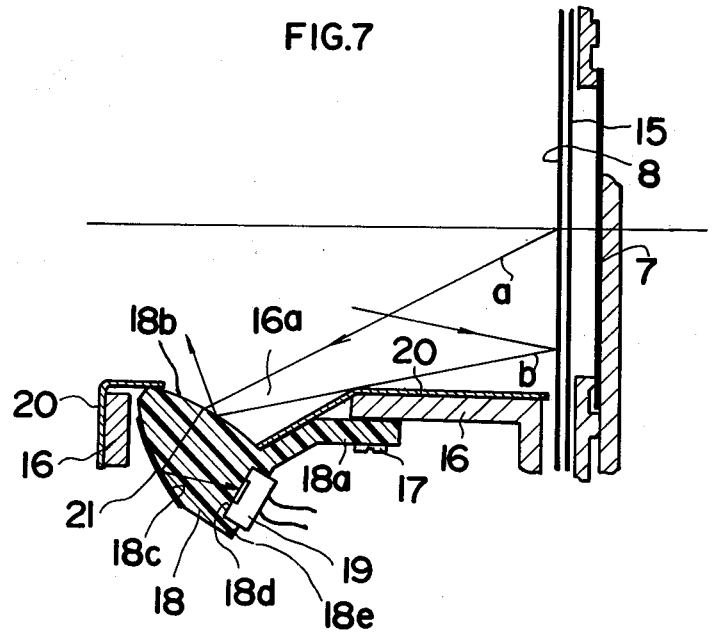
FIG. 7 is a cross-sectional view of essential parts of the third embodiment shown in FIG. 6.

The above disadvantage is solved by the following embodiments. FIGS. 6 and 7 show a third embodiment of the present invention. In this embodiment, when movable mirror 6 is shifted to a retracted picture-taking position, front curtain 8 starts travelling in association with the movement of movable mirror 6, whereby exposure of film 7 is commenced. Rear curtain 15 of a focal plane shutter is allowed to travel by operation of an exposure control device (not shown) which is controlled in response to the output of a light measuring element, after a given period of time, depending on the brightness of an object, from the starting of travelling of front curtain 8, to terminate exposure.

16 is part of the camera body which constitutes a camera casing and which has opening 16a. Fastened by screw 17 to the under surface of camera body 16 is attaching portion 18a for transparent block 18 made of a transparent plastic material. Transparent block 18 has light incident surface 18b which confronts, through opening 16a, a given zone of the surface of front curtain 8 and film plane 7. Transparent block 18 further includes light reflecting surface 18c opposite light-incident surface 18b, and light emitting surface 18d oblique to light reflecting surface 18c. Light measuring element 19 is rigidly secured to attaching portion 18e to confront light emitting surface 18d.

In this embodiment, light incident surface 18b is convex, and light reflecting surface 18c is concave, so that transparent block 18 acts as a condensing element, whereby light reflected on specific zones of the surface of front curtain 8 and/or film plane 7 is collected by light measuring element 19.

Light shielding member 20 prevents reflection of light within the camera casing, and film 21 of aluminum or silver applied by vacuum-evaporation deposition onto transparent block 18 forms reflecting surface 18c. With this arrangement, light reflected by reflecting surface 18c is reflected through light emitting or exit surface 18d to the rear of the camera body, namely to the right as viewed in FIG. 7. For this reason, light measuring element 19 is positioned between transparent block 18, and shutter curtains 8, 15 and film plane 7.

Light rays a, diffusely reflected by specific zones of the surface of front curtain 8 and film plane 7 (for explanatory convenience, only the light reflected by the central portion of front curtain 8 is shown in FIG. 7.) passes through opening 16a, is refracted and transmits through light incident surface 18b of transparent block 18, then reflected by reflecting surface 18c as shown in FIG. 7, then is projected through light emitting surface 18d, and is eventually incident on light measuring element 19. However, light diffusely reflected by the zones other than the aforesaid specific zones of front curtain 8 and film plane 7 is also incident on light incident surface 18b, and reflected by reflecting surface 18c. However, such reflected light is diverted from light emitting surface 18d, such that the light from the zones other than the specific zones is not incident on light measuring element 19. Advantageously, a majority of normally reflected light rays b, reflected by the lower portions of the surface of front curtain 8 and/or film plane 7, is reflected by light incident surface 18b, although such reflection is largely dependent upon the inclination of light incident surface 18b with front curtain 8 and film plane 7. As a result, a majority of the normally reflected light does not enter transparent block 18. If such normally reflected light should enter the transparent block, it would be reflected by reflecting surface 18c to be directed above light measuring element 19, rather than towards light measuring element 19.

In this embodiment, even if transparent block 18 is remotely disposed from front and rear curtains 8, 15, respectively, and film 7, light measuring element 19 is positioned to the rear of transparent block 18. Such an arrangement avoids the necessity of enlarging the camera. Furthermore, no special treatment such as vacuum evaporation deposition is applied to light incident surface 18b of transparent block 18, so that there is no risk that the removal of dust or stain adhering to the light incident surface causes lowered performance of the light measuring optical system. Reflecting surface 18c of transparent block 18 is prepared by vacuum-evaporating aluminum or silver 21 on the back surface of transparent block 18. This eliminates the labor of removing dust or stain even if it clings to the back surface of the transparent block. Since light measuring element 19 is disposed with its light receiving surface in contact with light emitting surface 18d of transparent block 18, there is no possibility of dust or stain clinging to the light receiving surface.

As transparent block 18 is formed integrally with integral attaching portion 18a as shown in FIG. 7, the adjustment of the positions of light incident surface 18b as well as reflecting surface 18c relative to the surface of front curtain 8 and film plane 7, plus the position of light measuring element 19 relative to reflecting surface 18c, is simplified. Use of plastic as a material for transparent block 18 affords ease of molding attaching portions 18a and 18e integrally with the transparent block.

Figure 8:
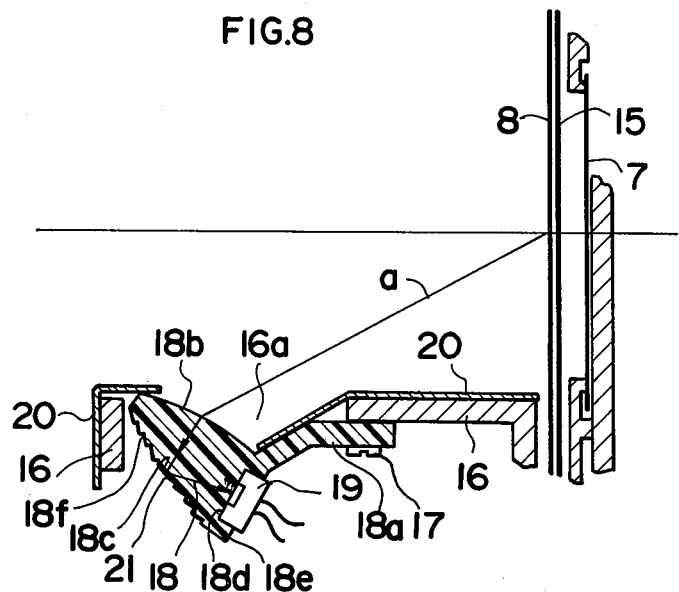
FIG. 8 is a cross-sectional view of a fourth embodiment of the present invention.

FIG. 8 shows a fourth embodiment of the present invention, wherein reflecting surface 18c of transparent block 18 is coaxially terraced and consists of a concave Fresnel lens. In this case, the radius of curvature of reflecting surface 18c of transparent block 18 is reduced, with the resultant reduction in the thickness as well as the weight of transparent block 18. Also, since there is no necessity to remove dust or stain adhering to reflecting surface 18c, the adhesion of dust or stain to recesses 18f on the reflecting surface 18c which accrue from the use of a Fresnel lens is negligible.

In place of a concave Fresnel lens used as reflecting surface 18c, light incident surface 18b may consist of a convex Fresnel lens. This produces a problem in removing dust or stain adhering to the slits in the light incident surface 18b, due to the use of a Fresnel lens. This problem is of little consequence, and well meets the objects of the invention to retain the desired function of the light measuring optical system even if dust or stain is wiped off.

Figure 9:
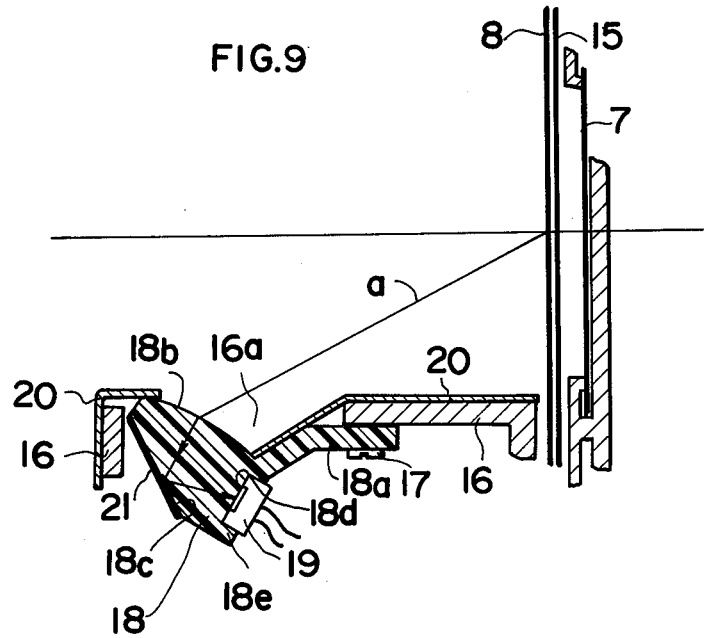
FIG. 9 is a cross-sectional view of the essential parts of a fifth embodiment of the present invention.

FIG. 9 shows a fifth embodiment of the present invention, wherein the light refractive power of surface 18b of transparent block 18 is increased, and reflecting surface 18c has a flat form, so as to provide a simple configuration of transparent block 18. As an alternative modification, transparent block 18 may be so arranged that light incident surface 18b is flat, and the light refractive power of reflecting surface 18c is increased.

The embodiments shown in FIGS. 6 through 9 can be modified as follows. For example, transparent block 18 may be made of glass, instead of plastic, with attaching portions 18a and 18e rigidly secured to the transparent block with a bonding agent. Also, light measuring element 19 is then directly fixed to light emitting surface 18d of transparent block 18, without providing attaching portion 18e. In the embodiments shown, transparent block 18 and light measuring element 19 are disposed in the lower portion of a camera casing, and the positions of these members may be interchangeable, as required by the particular circumstance.

Figure 10:
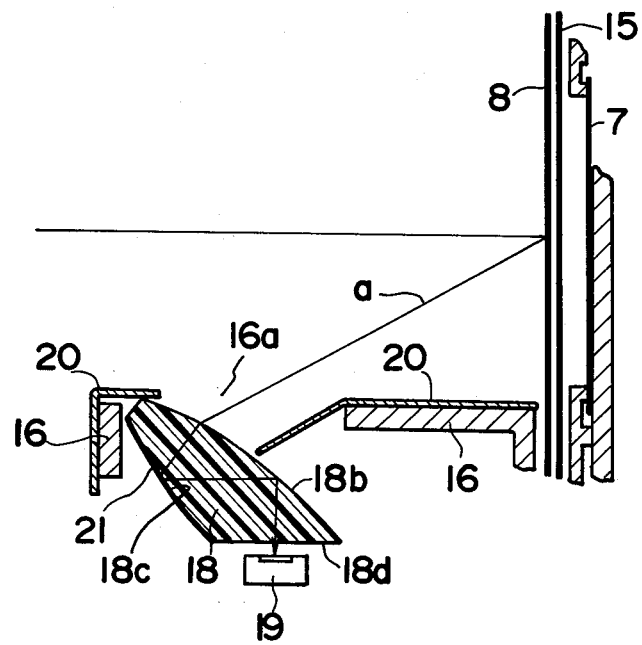
FIG. 10 is a cross-sectional view of the essential parts of a sixth embodiment of the present invention.
Figure 11:
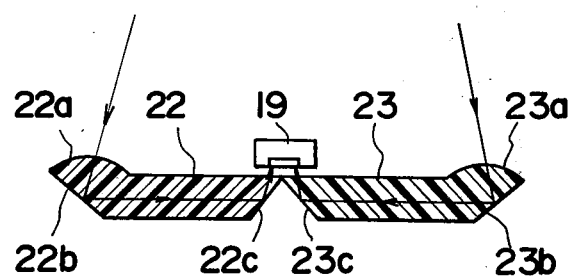
FIG. 11 is a cross-sectional view of the essential parts of a seventh embodiment of the present invention.

FIGS. 10 and 11 show still further embodiments of the invention. In the embodiment of FIG. 10, transparent block 18 is so constructed that light emitting surface 18d constitutes the bottom wall of the block, and light incident surface 18b functions as a second reflecting surface. Diffusely reflected light ray a passes through light incident surface 18b of transparent block 18, is reflected by reflecting surface 18c, then is subjected to total reflection by light incident surface 18b to be directed downwards, and eventually incident through light emitting surface 18d on light measuring element 19. Since, in this embodiment, light measuring element 19 is positioned below transparent block 18, it is necessary to enlarge the vertical size of a camera casing to some extent, as compared to the preceding embodiments. This, however, does not necessitate an increase in the longitudinal size of the camera casing.

In the embodiment of FIG. 11, a pair of transparent blocks 22 and 23 are provided so that the light diffusely reflected by the transversely wider zones of the surface of front curtain 8 and/or film plane 7 may be collected to be incident on a single light measuring element 19. To this end, two transparent blocks 22 and 23 have convex light incident surfaces 22a, 23a and reflecting surfaces 22b, 23b at the left and right ends thereof, respectively. Light rays which have been diffusely reflected respectively at a left part and a right part of front curtain 8 and/or film 7, and which have entered respective light incident surfaces 22a and 23a, are reflected by respective reflecting surfaces 22b and 23b, and then directed horizontally through respective transparent blocks 22 and 23. Thereafter, the light rays are reflected by reflecting surfaces 22c and 23c, which are located below light measuring element 19, and emitted from blocks 22 and 23 to light measuring element 19. Reflecting surfaces 22b, 22c, and 23b, 23c are plated with silver or aluminum by vacuum-evaporation deposition.

What is claimed is:

1. In a camera with automatic exposure control, including an objective lens, a camera body with film loaded at the focal plane of said objective lens, and a focal plane shutter having a leading shutter member and a trailing shutter member controlling the light reaching said film, a light measuring device for automatic exposure control, comprising:

light reflecting optical means facing a predetermined area of said focal plane to reflect light passing through said objective lens and reflected at a surface of said leading shutter member and/or a surface of said film, said light reflecting optical means including a transparent block having a light incident surface facing said predetermined area of said focal plane to receive the light reflected by the surface of said leading shutter member and/or the surface of said film, a light reflecting surface for reflecting the light passing through said light incident surface, and a light exit surface from which the light reflected by said light reflecting surface emerges; and light responsive means facing said light exit surface of said transparent block to receive the light reflected by said light reflecting surface for generating an output for automatic exposure control, said light reflecting optical means and said light responsive means being disposed outside the light path from said objective lens to said focal plane.

2. A light measuring device as in claim 1, wherein said light reflecting optical means converges light reflected at the surface of said leading shutter member and/or the surface of said film onto said light responsive means.

3. A light measuring device as in claim 1, wherein said transparent block includes a portion thereof for securing to said camera body.

4. A light measuring device as in claim 3, wherein said transparent block is made of a plastic material.

5. A light measuring device as in claim 1, wherein said transparent block includes a portion thereof for securing said light responsive means thereto.

6. A light measuring device as in claim 5, wherein said transparent block is made of a plastic material.

7. A light measuring device as in claim 1, wherein said transparent block as a whole converges the light incident on said light incident surface onto said light responsive means.

8. A light measuring device as in claim 7, wherein said light reflecting surface of said transparent block is concave.

9. A light measuring device as in claim 8, wherein said light incident surface of said transparent block is planar.

10. A light measuring device as in claim 8, wherein said light reflecting surface of said transparent block is coaxially terraced.

11. A light measuring device as in claim 7, wherein said light incident surface of said transparent block is convex.

12. A light measuring device as in claim 11, wherein said light reflecting surface is planar.

13. A light measuring device as in claim 1, wherein said transparent block and said light responsive means are disposed below the optical axis of said objective lens.

14. A light measuring device as in claim 13, wherein said light incident surface of said transparent block is inclined with respect to said focal plane to reflect the light normally reflected at a lower part of the surface of said leading shutter member and/or a lower part of the surface of said film.

15. A light measuring device as in claim 1, wherein said first incident surface of said transparent block faces said light reflecting surface and said light exit surface of said transparent block to totally reflect the light reflected by said light reflecting surface to said light exit surface.

* * * * *